Oct. 19, 1943.   W. J. PODBIELNIAK   2,332,110
PACKING FOR FRACTIONATING COLUMNS
Filed Jan. 2, 1941    5 Sheets-Sheet 1

Inventor:
Walter J. Podbielniak
By Benjamin B. Schneider
Atty.

Oct. 19, 1943.　　W. J. PODBIELNIAK　　2,332,110
PACKING FOR FRACTIONATING COLUMNS
Filed Jan. 2, 1941　　5 Sheets-Sheet 3

Inventor:
Walter J. Podbielniak
By Benjamin B. Schneider
Atty.

Oct. 19, 1943.  W. J. PODBIELNIAK  2,332,110
PACKING FOR FRACTIONATING COLUMNS
Filed Jan. 2, 1941  5 Sheets-Sheet 4

Inventor:
Walter J. Podbielniak
By Benjamin B. Schneider
Atty.

Oct. 19, 1943.  W. J. PODBIELNIAK  2,332,110
PACKING FOR FRACTIONATING COLUMNS
Filed Jan. 2, 1941    5 Sheets-Sheet 5

Inventor:
Walter J. Podbielniak
By Benjamin B. Schneider
Atty.

Patented Oct. 19, 1943

2,332,110

UNITED STATES PATENT OFFICE 2,332,110

PACKING FOR FRACTIONATING COLUMNS

Walter J. Podbielniak, Chicago, Ill., assignor to Benjamin B. Schneider

Application January 2, 1941, Serial No. 372,721

30 Claims. (Cl. 261—94)

This invention relates to packings for fractionating columns and to methods of making such packings. The improved packings are highly effective in both low and high temperature fractionating apparatus particularly in columns having a small diameter in comparison to distilling capacity and having a small hold-up of liquid with reference both to theoretical plate capacity and unit distilling capacity. However, the packings are highly effective in large diameter columns also.

Although many packings for fractionating columns are known in the prior art, all but a few have not, in general, been efficient in promoting clean separation of a mixture into its constituents where the boiling points of the constituents varied within 10° C. Also, the fractionating efficiencies of distilling columns containing these prior art packings have not been very high, rarely exceeding 10 to 15 theoretical plates (per 38" length of column). Packings up to about 2 plates per inch length have been described; however, these packings have, in general, a relatively high holdup of liquid per theoretical plate and relatively low distilling capacity per unit cross-sectional area.

For the separation of pairs of compounds having relatively close boiling points such as butadiene from n-butane (B. P. difference about 4.3° C.) and iso-butane from iso-butene (B. P. difference about 4.0° C.) or for the more facile and sharper separation of compounds of relatively higher boiling point differences, such as iso-butane from n-butane, a more effective packing in terms of number of theoretical plates of fractionating efficiency characterized by low liquid hold up and high distilling capacity, has long been desired.

In accordance with the present invention, I have devised a column packing which not only meets the need for a packing of the above character, but for a still more efficient packing now required in the petroleum technology field. Thus in the fields of alkylation and catalytic cracking close analytical control of cracked $C_4$ and $C_5$ fractions is required since important compounds within these fractions boil as close as 4.0° C. apart and less. This novel packing has a fractionating efficiency equivalent to more than 45 to 50 theoretical plates (per 38" length of column) and as much as 50 theoretical plates (per 15" length of column). Due to its construction, the packing accommodates itself to the column walls thereby permitting its use in non-precision-bore columns for low temperature distillations. Previously, precision-bore tubes have been a necessity for use in high efficiency packings.

The packings of my invention are generally characterized by being of wire wound, preferably, in regular coils in such a manner as to substantially eliminate continuous vertical liquid paths. By the elimination of continuous vertical liquid paths channeling of vapor or of reflux liquid is effectively prevented. The substantial elimination of crossed wires permits free movement of liquid films. The clearance between the wire coils is of the order for the production of capillary films of reflux liquid so that intimate vapor to liquid contact is assured.

The regularity of my improved packing in both horizontal and vertical directions of the column is such that substantially uniform gas and liquid paths are provided in all parts of the column. Uniform vapor flow and uniform vapor-liquid contacting throughout the column has been obtained by my improved packing with a resultant higher distilling capacity per unit of cross sectional area than in any prior art packings.

An important feature of the new packing is the uniformity of all vapor paths with regard to flow resistance and contacting effectiveness. The uniformity of flow resistance prevents to a substantial degree the local expansion and contraction of vapors usually present in prior art column packings at various regions. Furthermore, my improved packing provides vapor paths and contact effectiveness at the center and outer portions of the columnar cross-section of substantially equal values.

In general and preferably my invention contemplates the formation of non-circular coils of wire in uniform geometrical patterns with the major coil axis generally vertical and the coil pitch so chosen as to reduce to a minimum the vertical component of the coil wire. Any tendency for the continuous alignment of vertical components of adjacent coils is eliminated by skewing or twisting of the coils themselves about the generally vertical axis. The coil section itself may have any configuration. By having a variable radius of curvature for the perimeter of the coil section, break up of horizontal films is promoted due to the tendency of the film to contract. Circular coils are, in general, to be avoided because they have the greatest tendency of all sections to bridge over with films thus obstructing the vapor paths; however my invention contemplates packings including circular coils where the diameters of these coils are large enough to avoid objectionable film bridging.

By properly choosing desirable coil formations and closely spacing the wire vertically, the entire packing becomes a skeleton for a large number of capillary films and a sponge effect results. This effect is sufficiently strong so that reflux liquid is pulled off the column walls and prevents the formation of any vertically continuous liquid path.

The packing itself may conveniently be formed by winding wire on a suitably shaped mandrel and maintaining the same intact until disposed in a column. After positioning of the packing inside a column, removal of the mandrel is effected, leaving the springy wire coils to expand and fill the column. This permits a close conformation between the bore of a column and packing, thereby eliminating the requirement for precision-bore tubes as with the prior art packings. The removal of the mandrel itself may be effected in a simple manner by utilizing a material different from the wire material and dissolving the mandrel material only. Other methods of removal may occur to those skilled in the art.

In order to fill the circular section of the column bore with as much packing as possible, complementary groups of packing units may be disposed therein. Various combinations of packing units may be utilized for more effective filling. In particular, coils having sectorial sections may be grouped so that a more or less symmetrical disposition of packing units results.

Referring to the drawings:

Fig. 5 is a transverse section of a column packed with units similar to that of Figs. 2 and 3;

Fig. 6 is an elevation of the packed units of Fig. 5 with the units still retaining the removable cores; the tube itself being shown in section;

Figure 1:
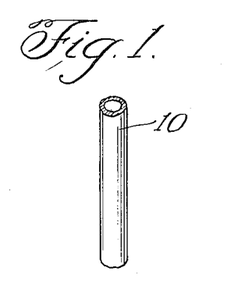
Figure 1 shows a length of column into which packing may be disposed.

Referring to Fig. 1, there is shown a distilling tube 10 of a conventional fractionating column. This tube may have any suitable dimensions and may be used for conducting either low or high temperature distillations. Thus, for example, the tube may be of similar construction and may be dimensioned as described in my prior application Serial No. 303,434, filed November 8, 1939, or as in my prior Patent No. 1,917,272; however, it need not be precision-bore. In general, the internal diameter of the tube may vary within rather wide limits, say from about 2.5 to about 25 mm., or even more, if desired. For low temperature distillations, I prefer that the tube have an internal diameter of from about 2.5 to about 4.5 mm. since I have noted that low holdup and high fractionating efficiency is had with such a tube. For high temperature distillations, the internal diameter of the tube may vary from about 6 mm. upwards, to meet any desired need.

Figures 2, 3, 4A, 4B, 4C, 4D, 4E, 7:
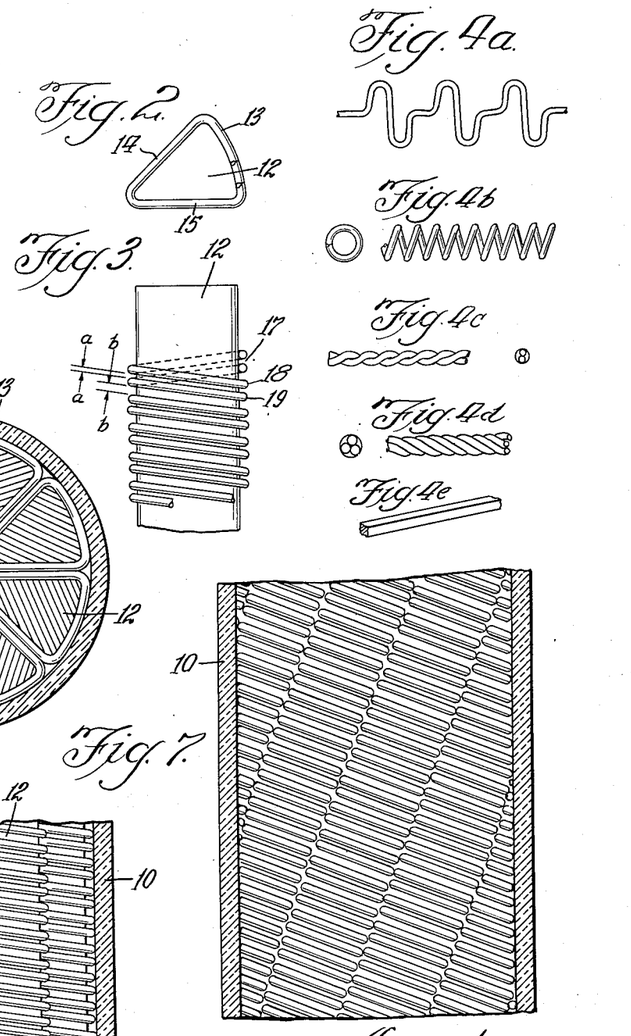
Fig. 2 is a top view of one coil of a sectorial shaped packing unit wound about a removable core.
Fig. 3 is a fragmentary elevation of the packing unit of Fig. 2.
Figs. 4a to 4e are details showing the various kinds of wire shapes that may be used as elements to wind a packing unit.
Fig. 7 is a view similar to Fig. 6, but with the cores removed and showing the position assumed by the packing.

A preferred form of packing unit is shown in Figs. 2 and 3 and consists of a removable core 12 having wire wound around it. The core, in the form shown here, has a generally triangular section and may have side 13 as the arc of a circle with the sides 14 and 15 as the radii. Thus the section becomes a circular sector. The axis of the core and resulting helix may be a point equidistant from the three corners.

The core may be wound with one or more wire strands. As shown here it is wound with a bifilar strand 17 consisting of two separate wires 18 and 19 spaced a slight distance apart, say 2 to 4 mils, and, preferably, maintained in parallel relation throughout the extent of the helix; however, a tri-filar strand may be used, if desired. As shown at a—a and b—b, the pitch of the helix is slightly greater than the distance between wires 18 and 19.

The purpose of the spacing between the parallel wires and between the turns thereof will be described hereinafter.

The wire itself is of any suitable corrosion resistant material such as stainless steel, Monel metal, Inconel or the like. Preferably, the wire has some elasticity so that upon release it will tend to uncoil. The core or mandrel may be of any metal that can be selectively dissolved without attacking the wire. Such metals as copper, aluminum, brass or the like may be used for this purpose. Thus, copper or brass may be dissolved out with nitric acid without affecting stainless steel wire. Aluminum may be dissolved by caustic soda in a similar manner.

Where a bi-filar strand is used, the wire may be straight and may be wound with a constant spacing. Since the pitch of a helix with a two wire strand may be greater than with a single wire, the necessity for accurate pitch control is lessened when using a bi-filar strand. If a single wire is used, it is preferred to shape it prior to winding to increase the film carrying capacity thereof. Thus it may be crimped as shown in Fig. 4a or coiled as shown in Fig. 4b. A two wire twisted strand as shown in Fig. 4c or a three wire twisted strand as shown in Fig. 4d may be used as the helix forming element. A non-circular single wire, such as the rectangular wire shown in Fig. 4e may also be used. Other wire shapes may be used, if desired.

The complete packing unit consisting of a core and winding may be handled without fear of the wire uncoiling. Due to the non-circular nature of the helix, the wire is retained in place even though wound under tension. It is understood that in winding, the tension is sufficient to shape the coils and cause the wire to hug the core closely without creating an excessive uncoiling force while the core is in position.

As shown in Figs. 5 and 6, column 10 has a plurality of packing units compactly disposed therein with the circular sides 13 all disposed adjacent the column surface. After the disposition of the packing units within column 10, the various cores may be dissolved or removed.

If the various packing units all have the helix thread in the same sense, i. e., right hand or left hand, the cumulative uncoiling tendencies of the various units upon core removal results in a skewing or twisting of the packing units about the column axis, as shown in Fig. 7. This is a preferred form of packing in accordance with my invention.

This twisting may be eliminated to a substantial degree, if desired, by having the threads of adjacent units alternate from right to left. Thus opposing forces will be generated which tend to maintain each helix substantially straight.

Removal of the cores results in the formation of a region or passageway within each coil in addition to a very small central region or passageway through which the vapors to be distilled may flow. The shapes of these passageways are indicated, generally, at 22 and 23, respectively, of Fig. 5. It will be noted that no completely circular voids are present and hence no horizontal liquid films are promoted.

Figures 8, 9, 10, 11, 12, 13:
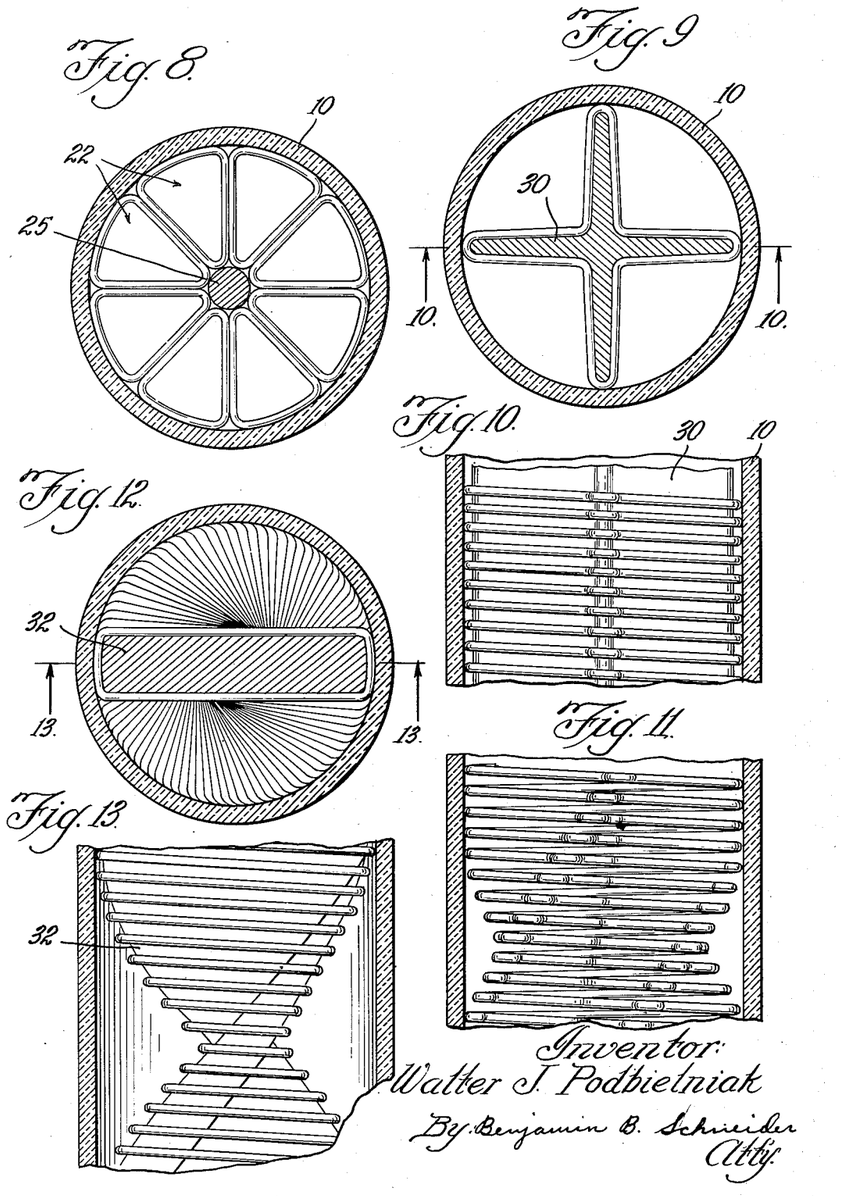
Fig. 8 shows a packed column section similar to that shown in Fig. 5, but provided with a permanent central core.
Fig. 9 shows a packing unit having a cruciform coil in a column, with the removable core still in position.
Fig. 10 is a sectional elevation on line 10—10 of Fig. 9.
Fig. 11 is a view similar to Fig. 10, but showing the position assumed by the packing after the wound core is twisted about the column axis and the core removed.
Fig. 12 is a sectional view of a column packed with a rectangularly coiled unit twisted around the column axis with the removable core still in position.
Fig. 13 is a sectional elevation on line 13—13 of Fig. 12.

Referring now to Fig. 8, there is shown a packing assembly similar to that shown in Figs. 5 to 7 but wherein the central space 23 is filled with a permanent core 25 formed of the same or equivalent corrosion-resistant material as the wire. This core may have a round or irregular section.

In Figs. 9 to 11 inclusive, a cruciform core 30 has wire wound therearound. Thereafter the core may be twisted to give the helix a skew or twist. Then the unit is disposed in a column and the core removed or dissolved to leave a hollow helix whose coils are staggered or twisted with respect to each other.

Figs. 12 and 13 show a packing unit having a generally rectangular removable core 32 wound with wire and thereafter twisted. The core is thereupon removed as described above, leaving a hollow helix.

Figure 14:
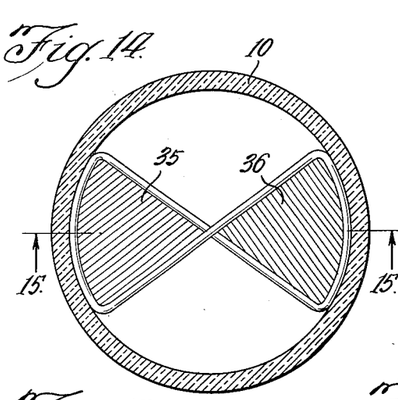
Fig. 14 is a section of a column packed with a figure 8 unit having one continuous wire on two separate cores.
Figure 15:
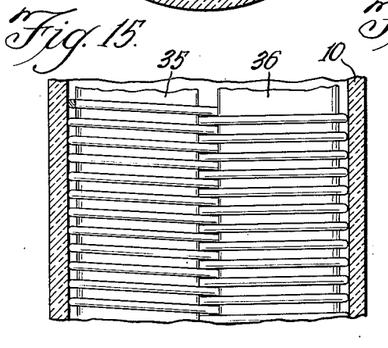
Fig. 15 is a sectional elevation on line 15—15 of Fig. 14.
Figure 16:
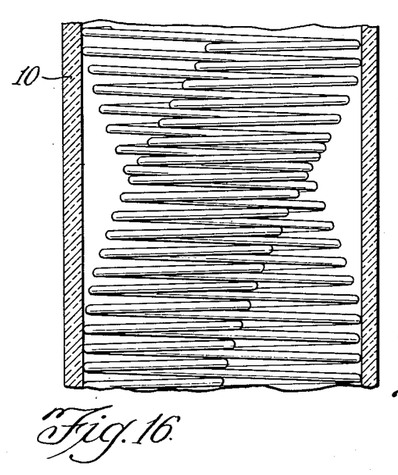
Fig. 16 is an elevation showing the packing in Fig. 15 after twisting of the wound core and removal of the core.

Figs. 14 to 16 inclusive show a column with a single packing unit having a general figure 8 cross-section. The cores 35 and 36 may be similar in shape to core 12 of Fig. 3, but one continuous length of wire is used to wind both cores. A hollow twisted packing may be obtained as shown in Fig. 16 by twisting the wound cores and then dissolving out the cores.

Figure 17:
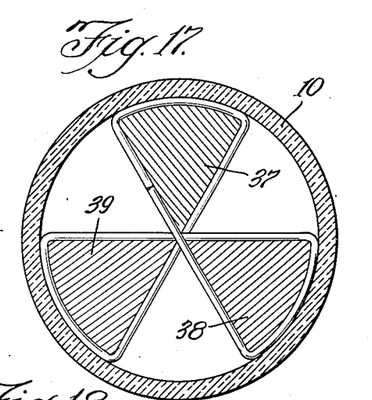
Fig. 17 is a section of a column packed with a unit having a single wire tri-foliate section.
Figure 18:
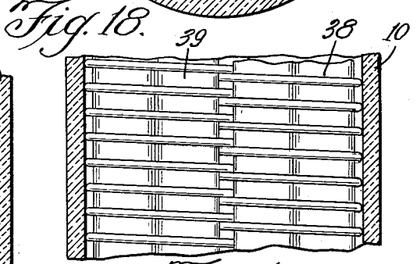
Figs. 18 and 19 are views bearing the same relation to Fig. 17 as Figs. 15 and 16 bear to Fig. 14.
Figure 19:
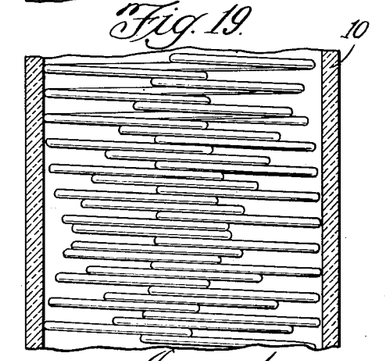

Figs. 17 to 19 inclusive show a tri-foliate construction resembling the construction shown in Fig. 14 in being formed of one continuous length of wire coiled around three cores 37, 38 and 39. The cores are removed as in the other forms. Before removal, the packing unit may be twisted to provide the shape shown in Fig. 19.

Figure 20:
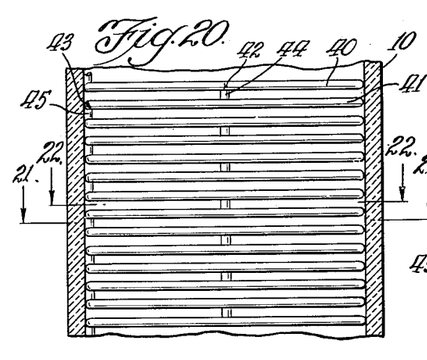
Fig. 20 is an elevation of a column having a pan-cake type of packing.
Figure 21:
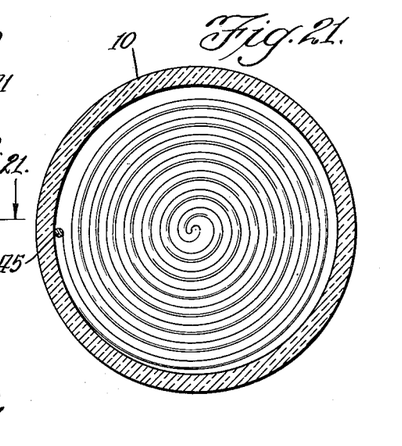
Figs. 21 and 22 are sections on lines 21—21 and 22—22, respectively, of Fig. 20 showing top views of pan-cake elements at different column levels.
Figure 22:
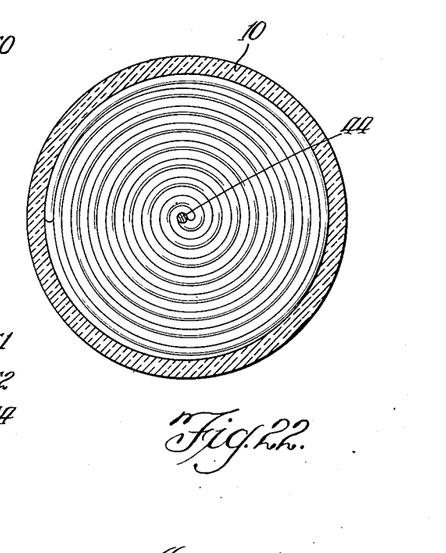

Figs. 20 to 22 inclusive show flat, horizontal spirals 40 and 41, the adjacent ones being mirror images of each other and joined at the centers 42 and outer ends 43, respectively. Short vertical portions 44 and 45 are formed where adjacent spirals join but since these portions are discontinuous their tendency to form channelling paths is negligible. In fact, the portions 45 representing the junctions of outer spiral ends may be staggered rotatively around the column axis so that no vertical alignment of such portions is present.

Figure 23:
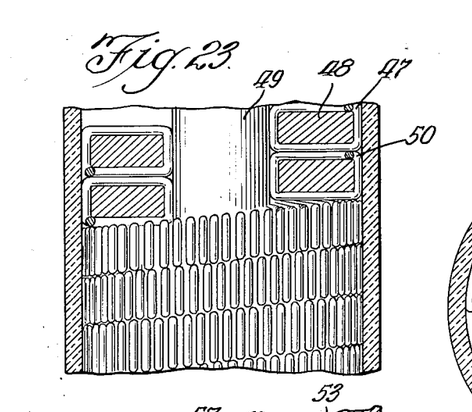
Fig. 23 is a section of a column showing a particular type of packing unit partly in section and partly in elevation.

In Fig. 23 a helix is shown where the generating element consists of a generally rectangular helix 47 of wire. This generating helix 47 is formed by coiling the wire around a straight rectangular core 48. The final helix is then formed by bending or winding the wound core in the form of a helix about a permanent core 49, formed of the same material as the wire. The core 48 is thereafter dissolved out. The corners 50 of the rectangular helix have enough curvature to break up the continuity of any wire elements that may be aligned vertically. It is apparent that the permanent central core 49 fills the central channel and that the path for the fluid is the staircase-like hollow of the helix.

Figure 24:
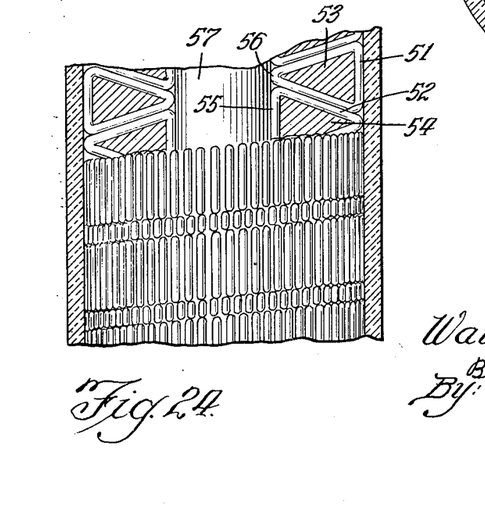
Fig. 24 is a section similar to that of Fig. 23 but showing a modified form.

In Fig. 24 a modification of the packing shown in Fig. 23 is illustrated. Here two nested generating helices 51 and 52 are provided. These helices have a generally triangular cross-section and are wound on straight, triangular-shaped, removable cores 53 and 54. The final helices are formed by winding the nested wound cores about a permanent core as described in connection with Fig. 23. Helices 51 and 52 are disposed as shown to form a composite double generating helix having a generally rhomboid section. The coiling of this composite double helix provides a packing having alternate wide and narrow bands 55 and 56, respectively, lengthwise of the column. These wide and narrow bands are formed by the base and apex of the individual generating helices 52 and 51, respectively. Again, the curvature of the wire will break up any tendency for a continuous vertical wire path for liquids or gases to be formed. Here also, the path for the fluid is the staircase-like hollows of the helices.

Figure 25:
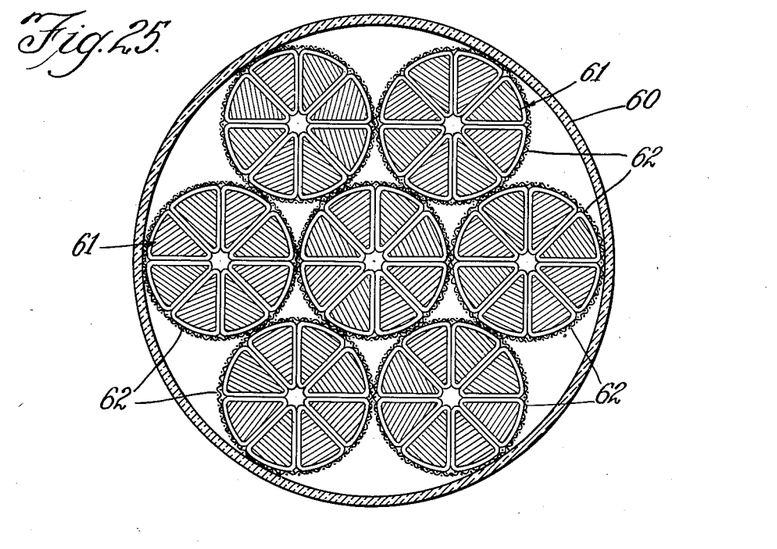
Fig. 25 is a transverse section of a packed column having a plurality of composite packed assemblies, each assembly being enclosed in a retaining screen.
Figure 26:
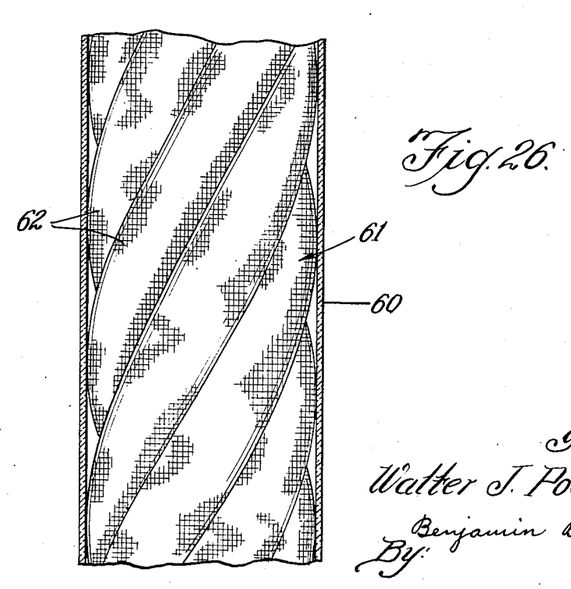
Fig. 26 is an elevation of a part of the column shown in Fig. 25 and illustrating the skewing of the packing assemblies.

For large diameter columns, the construction shown in Figs. 25 and 26 may be provided. As shown, column 60 has a plurality of packing assemblies 61 disposed therein. Each assembly 61 may be similar to the one shown in Fig. 5, for example, or in fact any other form. A wire mesh 62 encloses each assembly to maintain the same intact. As shown, the assemblies are disposed to fill up the column space most effectively. The above described technique of dissolving out the cores or mandrels may be used.

Upon dissolution of the cores, the individual packing units of the individual assemblies 61 assume the twisted position illustrated in Fig. 7 and the entire group of assemblies assume the twisted position shown in Fig. 26. It is clear that beginning with packing units as shown in Fig. 2, for example, assemblies and groups of assemblies may be built up to form any desired size of packing.

If desired, the form of packings of Figs. 23 and 24 may be modified by providing one or more similar or reversed helically wound helices wound about the helices shown in the drawings, thereby producing, in effect, a multiple telescoped, helix structure. It is, of course, manifest that the number, pitch and dimensions of the individual helical elements of this telescoped structure can be adjusted to provide vapor paths throughout the column of similar length by adjusting the pitch of the outer helix with respect to the inner one. With these modified packings an improved and increased distilling capacity may be obtained.

As is well known, the capillary action of a liquid is a function of its surface tension, as well as other factors like capillary dimensions. It follows therefore that the pitch of the various forms of helices will depend in a measure upon the liquids to be handled as well as wire gauge. In general, the pitch should not be so great as to provide clearances between the wires of adjacent coils of such magnitude as to avoid the formation of capillary films for the liquid to be distilled, or treated as hereinafter described. For most fairly free-flowing liquids such as alcohol, gasoline, benzene and the like, the clearance between adjacent turns or coils should not exceed about 15 mils, and preferably should be maintained between about 2 to 8 mils. For comparatively viscous liquids such as lubricating oils, liquid fatty acids and the like, the clearance may be increased up to about 20 to 25 mils and even higher, as desired. It is usually desirable to determine by experimentation that clearance between adjacent coils where optimum capillarity exists for the particular liquid being treated.

Where a bi-fillar winding is used, the two wires may be spaced apart about 2 to 4 mils and the spaces between adjacent coils of twinned wires may be in the order of at least 2 to 8 mils, preferably at least 5 to 8 mils for convenience in manufacture. Such a packing is particularly adapted for columns having an internal diameter in the order of about 5 mm. and ranging as high as 30 to 40 mm. and even greater. The wire may have a gauge number of 28 B. & S. or may be coarser or finer as occasion demands. In general, however, it is preferred to use wire whose diameter is small compared to the helix cross-sectional dimensions and also to maintain a helix pitch larger than but of the order of the wire diameter.

In the packings as herein described, the coils are, in general, non-circular to avoid the formation of cross films. It is to be understood, however, that my invention contemplates the formation of packings having circular coils where the coils are of such dimensions as to prevent the formation of liquid films across the coils. It has been found by experiment that circular coils tend to bridge over with most organic liquids when the coil diameter is in the order of about 2½ mm. or less.

While my novel packing has been described in connection with distilling apparatus, it is manifest that this packing may be used in apparatus designed for scrubbing a gas with a liquid. Also, my packing may be used in counter-current treating apparatus to effect a more extended and intimate contact between counter-flowing liquids and vapor or gas, or between counter-flowing, immiscible liquids of different densities. Thus, for example, the packing may be used in counter-current treating apparatus designed for the treatment of petroleum with sulphuric acid to refine the former.

I claim:

1. A packing unit for use in a fractionating column or the like, said unit consisting of a core and wire coiled around said core, said wire and core being of dissimilar materials, adjacent coils of wire being separated by a distance short enough to support a capillary film between adjacent wires, said core being adapted to be selectively dissolved to leave said wire.

2. A packing unit for use in a fractionating column or the like, said unit comprising a core having a non-circular cross section, and wire coiled around said core with adjacent loops separated from each other a distance short enough to support a capillary film therebetween, said core being adapted to be selectively dissolved to leave said wire.

3. A packing for fractionating or scrubbing columns and the like, said packing comprising a wire helix having a substantially straight vertical axis, the loops of said helix being separated from each other a distance short enough to support a capillary film between adjacent wires, said helix having a generally cruciform section, the loops of said helix being rotatively staggered progressively along the vertical axis.

4. A packing for fractionating or scrubbing columns and the like, said packing comprising a wire helix with the axis thereof extending generally parallel to the column axis, the loops of said helix being separated from each other a distance short enough to support a capillary film between adjacent wires, said helix having a generally rectangular cross-section with the loops of said helix rotatably staggered progressively along the axis thereof whereby a twisted helix is formed.

5. A packing for fractionating or scrubbing columns and the like, said packing comprising a wire helix with the axis thereof extending generally parallel to the column axis, the loops of said helix being separated from each other a distance short enough to support capillary film between adjacent wires, said helix having a generally figure 8 cross-section and being formed of one continuous length of wire, said loops being rotatively staggered progressively along the length of said column.

6. A packing for fractionating or scrubbing columns and the like, said packing comprising a wire helix with the axis thereof extending generally parallel to the column axis, the loops of said helix being separated from each other a distance short enough to support a capillary film between adjacent wire loops, said helix having a generally tri-foliate section, the loops of said unit being progressively staggered rotatively along the length of said column.

7. A packing for fractionating or scrubbing columns and the like, said packing comprising a series of interconnected, substantially flat, superimposed spirals formed of wire, the loops and turns of said spiral and the spacing between adjacent spirals having a distance short enough to support a capillary film between adjacent wires, said spirals being adapted to lie in planes transverse of the column axis.

8. The method of making a packing for fractionating columns and the like, said method comprising winding wire around a core of a material different from the wire, inserting said unit into a column and dissolving said core out to allow said wire to expand and fill said column.

9. The method of making a fractionating column packing, said method comprising coiling wire around an elongated core, coiling said wound core to form a helix, inserting the formed and wound core unit into a column and dissolving out said core.

10. The method of forming a packing for fractionating columns or the like, said method comprising crimping a normally straight wire, coiling said crimped wire about a core to form a series of substantially similar non-circular loops, inserting said wound core into a column and dissolving out said core.

11. The method of making a packing for fractionating columns and the like, said method comprising winding wire around an elongated, sectorially-shaped core to form a packing unit, arranging a plurality of said units in parallel, packed relationship to form a generally circular assembly, inserting said assembly into a column and dissolving out the cores.

12. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising a generally circular helix with the axis thereof extending generally parallel to the tube axis, said helix being formed by winding a smaller coil of wire in a helical manner, the loops of said coil having a generally rectangular cross-section and being of substantially uniform size, said loops forming areas substantially transverse to the paths of vapor flow at the regions of said loops and said loops being separated from each other, the distance of separation being short enough to support a capillary film between adjacent wires, and a permanent core filling the space within the said generally circular helix whereby an ascending, generally spiral, passageway within the said smaller coil of wire is formed.

13. A vapor-liquid contacting device for fractionating or scrubbing columns and the like comprising an elongated tube and a wire packing disposed within said tube in a uniformly regular manner to provide substantially uniform vapor and liquid paths through said tube, said packing having a central permanent core substantially throughout the length thereof, said packing comprising a double helical wire structure wound helically around said core, said two helices being parallel and alongside of each other and each consisting of a wire helix having a non-circular cross-section, the loops of said helices being of substantially uniform size, said loops forming areas substantially transverse to the paths of vapor flow at the regions of said loops, said loops being separated from each other, the distance of separation being short enough to support a capillary film between adjacent wires, and the adjoining sections of said two helices forming a composite generally rhomboid section.

14. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising a generally circular helix with the axis thereof extending generally parallel to the tube axis, said helix being formed by winding a smaller coil of wire in a helical manner, the loops of said coil having a non-circular cross-section and being of substantially uniform size, said loops forming areas substantially transverse to the paths of vapor flow at the regions of said loops and said loops being separated from each other, the distance of separation being short enough to support a capillary film between adjacent wires, and a permanent core filling the space within the said generally circular helix whereby an ascending, generally spiral, passageway within the said smaller coil of wire is formed.

15. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising a helix with the axis thereof extending generally parallel to the tube axis, said helix being formed by winding a smaller coil of wire in a helical manner, the loops of said coil being of substantially uniform size and having uniform geometrical patterns, said loops forming areas substantially transverse to the paths of vapor flow at the regions of said loops and said loops being separated from each other, the distance of separation being short enough to support a capillary film between adjacent wires.

16. A vapor-liquid contacting device for fractionating or scrubbing columns and the like comprising an elongated tube and a wire packing disposed within said tube in a uniformly regular manner to provide substantially uniform vapor and liquid paths through said tube, said packing including a plurality of units, each unit consisting of a pair of closely spaced wires in substantially parallel relation coiled to form a series of substantially similar loops having a sectorial cross-section substantially throughout the entire tube, each of said spaced wires being preshaped prior to coiling to provide supporting element portions for capillary films, said loops forming areas substantially transverse to the paths of vapor flow at the regions of said loops and said loops being separated from each other, the distance of separation being short enough to support a capillary film between adjacent wires, each unit having an axis passing through the area formed by each of said loops, said units being symmetrically disposed in said tube so that they form a generally circular composite substance with an open region in the center of said section, and a permanent core filling a substantial portion of the said open region, the axes of said units winding around the tube axis and extending generally along the length of said tube.

17. A vapor-liquid contacting device for fractionating or scrubbing columns and the like comprising an elongated tube and a wire packing disposed within said tube in a uniformly regular manner to provide substantially uniform vapor and liquid paths through said tube, said packing including a plurality of units, each unit consisting of at least one continuous wire coiled to form a series of substantially similar loops having a sectorial cross-section, said loops forming areas substantially transverse to the paths of vapor flow at the regions of said loops and said loops being separated from each other, the distance of separation being short enough to support a capillary film between adjacent wires, each unit having an axis passing through the areas formed by each of said loops, said units being symmetrically disposed in said tube so that they form a generally circular composite section with an open region in the center of said section, and a permanent core filling a substantial portion of the said open region, the axes of said units winding around the tube axis and extending generally along the length of said tube.

18. A vapor-liquid contacting device for fractionating or scrubbing columns and the like comprising an elongated tube and a wire packing disposed within said tube in a uniformly regular manner to provide substantially uniform vapor and liquid paths through said tube, said packing including a plurality of units, each unit consisting of wire coiled to form a series of substantially similar loops having a sectorial cross-section, said loops forming areas substantially transverse to the paths of vapor flow at the regions of said loops and said loops being separated from each other, the distance of separation being short enough to support a capillary film between adjacent wires, each unit having an axis passing through the areas of each of said loops, said units being symmetrically disposed in said tube so that they form a generally circular composite section with an open region in the center of said composite section, and a permanent core filling a substantial portion of the said open region, the axes of said units winding around the tube axis and extending generally along the length of said tube.

19. A vapor-liquid contacting device for fractionating or scrubbing columns and the like comprising an elongated tube and a wire packing disposed within said tube in a uniformly regular manner to provide substantially uniform vapor and liquid paths through said tube, said packing including a plurality of units, each unit consisting of wire coiled to form a series of substantially similar loops having a sectorial cross-section substantially throughout the entire tube, said loops forming areas substantially transverse to the paths of vapor flow at the regions of said loops and said loops being separated from each other, the distance of separation being short enough to support a capillary film between adjacent wires, each unit having an axis passing through the areas of each of said loops, and said units being symmetrically disposed in said tube so that they form a generally circular composite section with an open region in the center of said section, the axes of said units winding around the tube axis and extending generally along the length of said tube.

20. A vapor-liquid contacting device for fractionating or scrubbing columns and the like comprising an elongated tube and a wire packing disposed within said tube in a uniformly regular manner to provide substantially uniform vapor and liquid paths through said tube, said packing including a plurality of units, each unit consisting of at least one continuous wire coiled to form a series of substantially similar loops having a sectorial cross-section substantially throughout the entire tube, said loops forming areas substantially transverse to the paths of vapor flow at the regions of said loops and said loops being separated from each other, the distance of separation being short enough to support a capillary film between adjacent wires, each unit having an axis passing through the areas of each of said loops, and said units being symmetrically disposed in said tube so that they form a generally circular composite section with an open region in the center of said section, the axes of said units winding around the tube axis and extending generally along the length of said tube.

21. A vapor-liquid contacting device for fractionating or scrubbing columns and the like comprising an elongated tube and a wire packing disposed within said tube in a uniformly regular manner to provide substantially uniform vapor and liquid paths through said tube, said packing including a plurality of continuous units, each unit consisting of wire coiled to form a series of substantially similar non-circular loops substantially throughout the entire tube, said loops forming areas substantially transverse to the paths of vapor flow at the regions of said loops and said loops being separated from each other, the distance of separation being short enough to support a capillary film between adjacent wires, each unit having an axis passing through the areas of each of said loops, said units being symmetrically disposed in said column with respect to the tube axis with the axes of said units winding around the tube axis.

22. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising a packing unit, said unit comprising a pair of closely spaced continuous wires in substantially parallel relation coiled to form a series of substantially similar loops substantially throughout the entire tube, said loops forming areas substantially transverse to the paths of vapor flow at the regions of said loops, said loops having uniform geometrically regular patterns and having openings of such shape and size as to prevent the formation of stable capillary films thereacross, and said loops being separated from each other, the distance of separation being short enough to support a capillary film between adjacent wires.

23. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising at least one continuous wire coiled to form a series of substantially similar loops substantially throughout the entire tube, said wire being preshaped prior to coiling to provide supporting element portions for capillary films, said loops forming areas substantially transverse to the paths of vapor flow at the regions of said loops, said loops having uniform geometrically regular patterns and having openings of such shape and size as to prevent the formation of stable capillary films thereacross, and said loops being separated from each other, the distance of separation being short enough to support a capillary film between adjacent wires.

24. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising a helix with the axis thereof extending generally parallel to the tube axis, said helix being formed by winding a smaller coil of wire in a helical manner, the loops of said coil having a non-circular cross-section and being of substantially uniform size and shape, said loops forming areas substantially transverse to the paths of vapor flow at the regions of said loops and said loops being separated from each other, the distance of separation being short enough to support a capillary film between adjacent wires.

25. A vapor-liquid contacting device for fractionating or scrubbing columns and the like comprising an elongated tube and a wire packing disposed in said tube in a uniformly regular manner to provide substantially uniform vapor and liquid paths through said tube, said packing comprising a helix extending substantially throughout the length of the tube with the axis thereof extending generally parallel to the tube axis, said helix being formed by winding a smaller coil of wire in a helical manner, the loops of said coil being of substantially uniform size and shape, said loops forming areas substantially transverse to the paths of vapor flow at the regions of said loops and said loops being separated from each other, the distance of separation being short enough to support a capillary film between adjacent wires.

26. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising at least one continuous wire, coiled to form a series of substantially similar loops extending substantially throughout the entire tube, thereby providing at least one continuous vapor path of uniform cross-sectional dimensions substantially throughout the length of the tube, said loops forming an expanded resilient structure which is frictionally retained within the tube and said loops having openings of such shape and size as to prevent the formation of stable capillary films thereacross, at least a substantial portion of each loop being out of contact with the inner wall of the tube, and said loops being separated from each other, the distance of separation being short enough to support a capillary film between adjacent wires.

27. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising a packing unit, said unit comprising at least one continuous wire, coiled to form a series of substantially similar loops extending substantially throughout the entire tube, said loops forming an expanded resilient structure which is frictionally retained within the tube and said loops having openings of such shape and size as to prevent the formation of stable capillary films thereacross, at least a substantial portion of each loop being out of contact with the inner wall of the tube, and said loops being separated from each other, the distance of separation being short enough to support a capillary film between adjacent wires.

28. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising at least one continuous wire, coiled to form a series of substantially similar loops extending substantially throughout the entire tube, thereby providing at least one continuous vapor path of uniform cross-sectional dimensions substantially throughout the length of the tube, said loops forming an expanded resilient structure which is frictionally retained within the tube and said loops having a uniform, geometrical pattern of non-circular configuration, at least a substantial portion of each loop being out of contact with the inner wall of the tube, and said loops being separated from each other, the distance of separation being short enough to support a capillary film between adjacent wires.

29. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising at least one continuous wire, coiled to form a series of substantially similar loops extending substantially throughout the entire tube, thereby providing at least one continuous vapor path of uniform cross-sectional dimensions substantially throughout the length of the tube, said loops forming an expanded resilient structure in frictional engagement with the inner wall of the tube and said loops having a uniform, geometrical pattern of non-circular configuration, at least a substantial portion of each loop being out of contact with the inner wall of the tube, and said loops being separated from each other, the distance of separation being short enough to support a capillary film between adjacent wires.

30. A vapor-liquid contacting device for fractionating or scrubbing columns and the like comprising an elongated tube and a wire packing disposed within said tube in a uniformly regular manner to provide substantially uniform vapor and liquid paths through said tube, said packing comprising at least one continuous wire, coiled to form a series of substantially similar loops extending substantially throughout the entire tube, thereby providing at least one continuous vapor path of uniform cross-sectional dimensions substantially throughout the length of the tube, said loops forming an expanded resilient structure tending to conform with the inner wall of the tube and said loops having a uniform, geometrical pattern of non-circular configuration, at least a substantial portion of each loop being out of contact with the inner wall of the tube, and said loops being separated from each other, the distance of separation being short enough to support a capillary film between adjacent wires.

WALTER J. PODBIELNIAK.